(12) United States Patent
Kim

(10) Patent No.: US 11,254,369 B2
(45) Date of Patent: Feb. 22, 2022

(54) VEHICLE BODY JOINT STRUCTURE

(71) Applicants: HYUNDAI MOTOR COMPANY, Seoul (KR); KIA MOTORS CORPORATION, Seoul (KR)

(72) Inventor: Do Hoi Kim, Seoul (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 0 days.

(21) Appl. No.: 16/895,327

(22) Filed: Jun. 8, 2020

(65) Prior Publication Data

US 2021/0179196 A1 Jun. 17, 2021

(30) Foreign Application Priority Data

Dec. 16, 2019 (KR) ........................ 10-2019-0167957

(51) Int. Cl.
*B62D 25/04* (2006.01)
*B62D 27/02* (2006.01)
*B62D 25/08* (2006.01)

(52) U.S. Cl.
CPC ........... *B62D 27/023* (2013.01); *B62D 25/04* (2013.01); *B62D 25/081* (2013.01)

(58) Field of Classification Search
CPC .... B62D 25/04; B62D 25/06; B62D 25/2036; B62D 25/081; B62D 27/02; B62D 27/023; B62D 27/00

USPC ..... 296/29, 30, 193.01–193.09, 203.01–203, 296/4, 205, 210
See application file for complete search history.

(56) References Cited

U.S. PATENT DOCUMENTS

| | | | | |
|---|---|---|---|---|
| 4,618,163 A | * | 10/1986 | Hasler | B62D 23/005 280/785 |
| 5,269,585 A | * | 12/1993 | Klages | B62D 29/008 296/201 |
| 5,332,277 A | * | 7/1994 | Enning | B62D 25/081 296/192 |
| 7,322,106 B2 | * | 1/2008 | Marando | B22D 19/045 29/507 |

FOREIGN PATENT DOCUMENTS

KR 10-2014-0091510 A 7/2014

* cited by examiner

*Primary Examiner* — Dennis H Pedder
(74) *Attorney, Agent, or Firm* — Lempia Summerfield Katz LLC

(57) ABSTRACT

A vehicle body joint structure is disclosed. The vehicle body joint is configured such that elements configured to connect pillars of a vehicle body can be easily shared by various kinds and designs of vehicles, thereby being capable of securing assemblability of elements including the pillars while achieving enhancement in strength and rigidity.

12 Claims, 11 Drawing Sheets

A

US 11,254,369 B2

VEHICLE BODY JOINT STRUCTURE

CROSS-REFERENCE TO RELATED APPLICATION

This application claims priority to and the benefit of Korean Patent Application No. 10-2019-0167957, filed on Dec. 16, 2019, the entire contents of which are incorporated herein by reference.

FIELD

The present disclosure relates to a vehicle body joint structure, and more particularly to a connecting structure of elements corresponding to pillars of a vehicle body.

BACKGROUND

The statements in this section merely provide background information related to the present disclosure and may not constitute prior art.

Pillars of a vehicle are classified into a front pillar, a center pillar, and a rear pillar in accordance with positions thereof. Such pillars not only perform a function to support a roof of the vehicle, but also perform an important function for enhancement in rigidity and safety of a vehicle body.

Conventional pillars have a structure formed by a combination of several mold parts, for application of a monocoque type design thereto. In this case, although the pillars exhibit superior rigidity, it may be almost impossible for the pillars to embody vehicles having various designs or to be employed as design parts shared by segments.

In an existing monocoque structure, the entirety of a front pillar may be designed using a single draw mold for inner and outer members. In this case, however, we have discovered that the front pillar may have little extensibility for connection thereof to other elements. Furthermore, new molds should be developed for different vehicles having different designs.

That is, when various products are manufactured in reduced numbers in association with production of existing vehicle bodies, or such products are manufactured in a smart factory, increased design modification is required. For this reason, the number of molds is remarkably increased and, as such, there is a problem of increased manufacturing costs.

Therefore, it is desired to develop a vehicle or a pillar structure, which has a new structure capable of securing rigidity and extensibility for connection to other elements while eliminating the above-mentioned drawbacks encountered in conventional cases.

The above matters disclosed in this section are merely for enhancement of understanding of the general background of the present disclosure and should not be taken as an acknowledgement or any form of suggestion that the matters form the related art already known to a person skilled in the art.

SUMMARY

The present disclosure provides a vehicle body joint structure in which elements configured to connect pillars of a vehicle body can be easily shared by various kinds and designs of vehicles, thereby being capable of securing assemblability of elements including the pillars while achieving enhancement in strength and rigidity.

In accordance with an aspect of the present disclosure, a vehicle body joint structure includes: a lower pillar member extending vertically from a side surface of a vehicle body, an upper pillar member disposed above the lower pillar member while extending vertically, a middle member matched with an upper portion of the lower pillar member while extending in forward and rearward directions, and a connecting bracket to which the lower pillar member, the upper pillar member and the middle member are fixedly mounted.

The upper pillar member may extend from the lower pillar member to be inclined in the forward or rearward direction.

The connecting bracket may surround the lower pillar member, the upper pillar member and the middle member, and may be formed with a panel portion configured to fill a space formed between the upper pillar member and the lower pillar member as the upper pillar member extends inclinedly from the lower pillar member.

The connecting bracket may have: an outer surface directed to an outside of the vehicle body while surrounding the lower pillar member, the upper pillar member and the middle member; and a closed inner surface directed to an inside of the vehicle body.

In one form, a plurality of ribs may be respectively formed on the outer surface and the closed inner surface of the connecting bracket except portions where the lower pillar member, the upper pillar member and the middle member are mounted, and ribs of the plurality of ribs are configured to extend in different directions to cross each other.

In one form, the connecting bracket may have an overlap portion where the lower pillar member, the upper pillar member and the middle member are matched. The lower pillar member, the upper pillar member and the middle member may be coupled together through the overlap portion.

In another form, the connecting bracket may include: an overlap portion where the lower pillar member, the upper pillar member and the middle member are matched; and a support portion formed at the overlap portion and configured to partition the lower pillar member, the upper pillar member and the middle member. The upper pillar member may be seated on the support portion.

The upper pillar member may have a lower portion extending along the middle member in the forward or rearward direction such that the lower portion is matched with an upper end of the middle member.

The upper pillar member may have a lower portion extending along the middle member in the forward or rearward direction. The connecting bracket may be formed with a branching portion configured to partition the upper pillar member and the middle member while extending in the forward and rearward directions between the lower portion of the upper pillar member and the middle member.

A cowl member may be connected to the upper pillar member such that the cowl member extends toward an inside of the vehicle body. A cutout may be formed at the connecting bracket and configured to allow the cowl member to pass through the connecting bracket.

The connecting bracket may include: a first part to which the lower pillar member and the middle member are mounted; and a second part to which the upper pillar member is mounted. The second part may be assembled to the first part above the first part.

An assembly protrusion may be formed at the first part or the middle member such that the assembly protrusion extends upwards. An assembly groove may be formed at the second part such that the assembly groove extends downwards to be matched with the assembly protrusion.

The assembly protrusion may be formed to extend in the forward and rearward directions such that a free end thereof protrudes in inward and outward directions of the vehicle body. The assembly groove may extend in the forward and rearward directions while being opened such that the assembly groove is matched with the assembly protrusion.

In the vehicle body joint structure configured as described above, the elements configured to connect pillars of the vehicle body can be easily shared by various kinds and designs of vehicles and, as such, it may be possible to secure assemblability of elements including the pillars while achieving enhancement in strength and rigidity.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
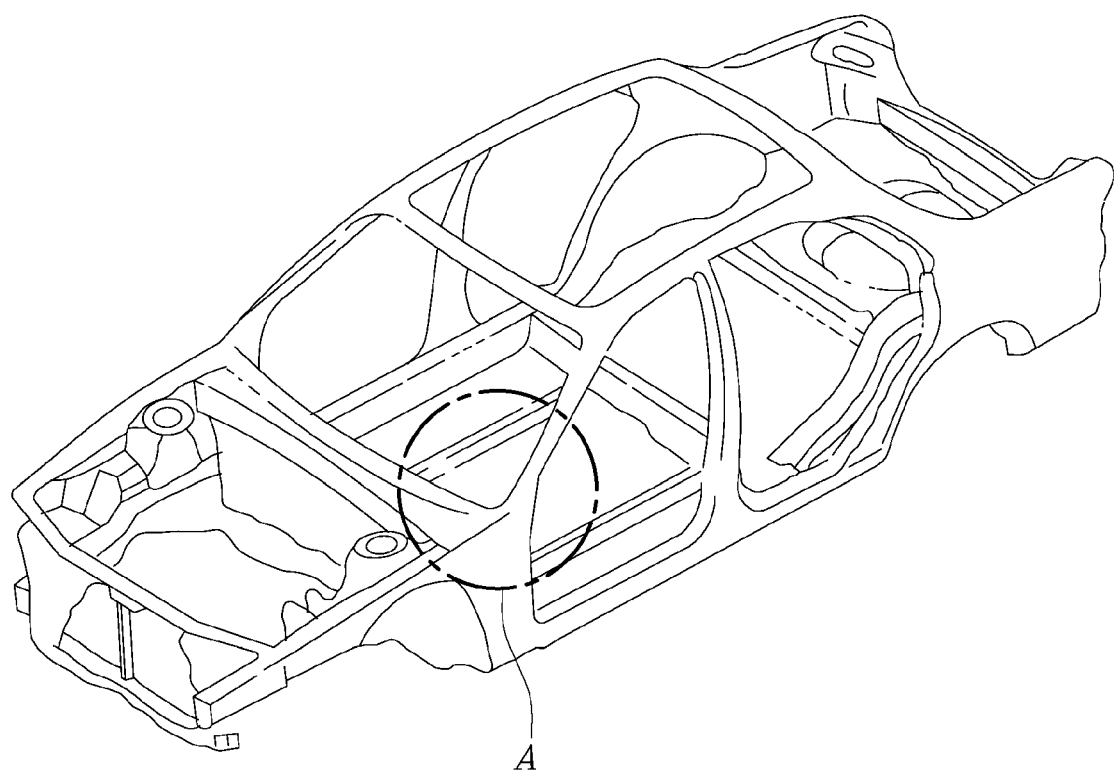
FIG. 1 is a view illustrating an area to which a vehicle body joint structure in one form of the present disclosure is applied.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Reference will now be made in detail to the exemplary forms of the present disclosure, which are illustrated in the accompanying drawings.

Figure 6:
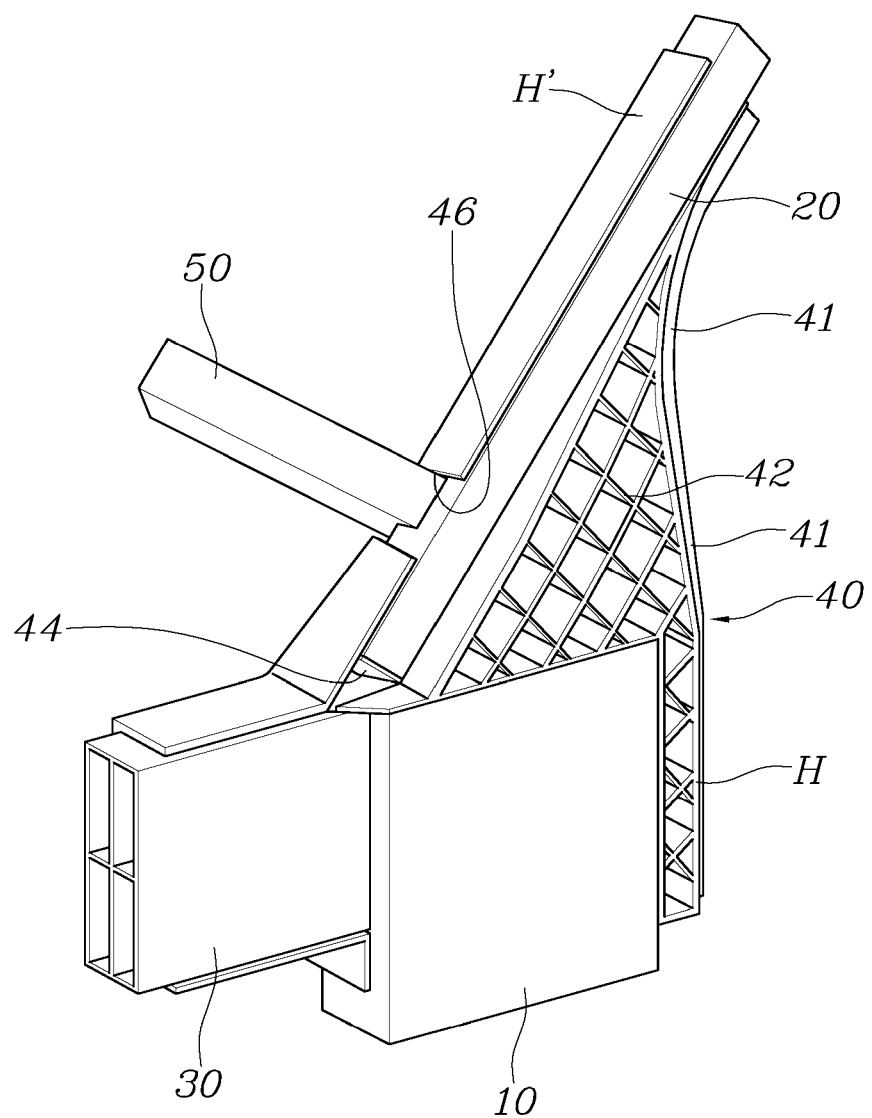
FIG. 6 is a view illustrating another form of the vehicle body joint structure shown in FIG. 2.
Figure 7:
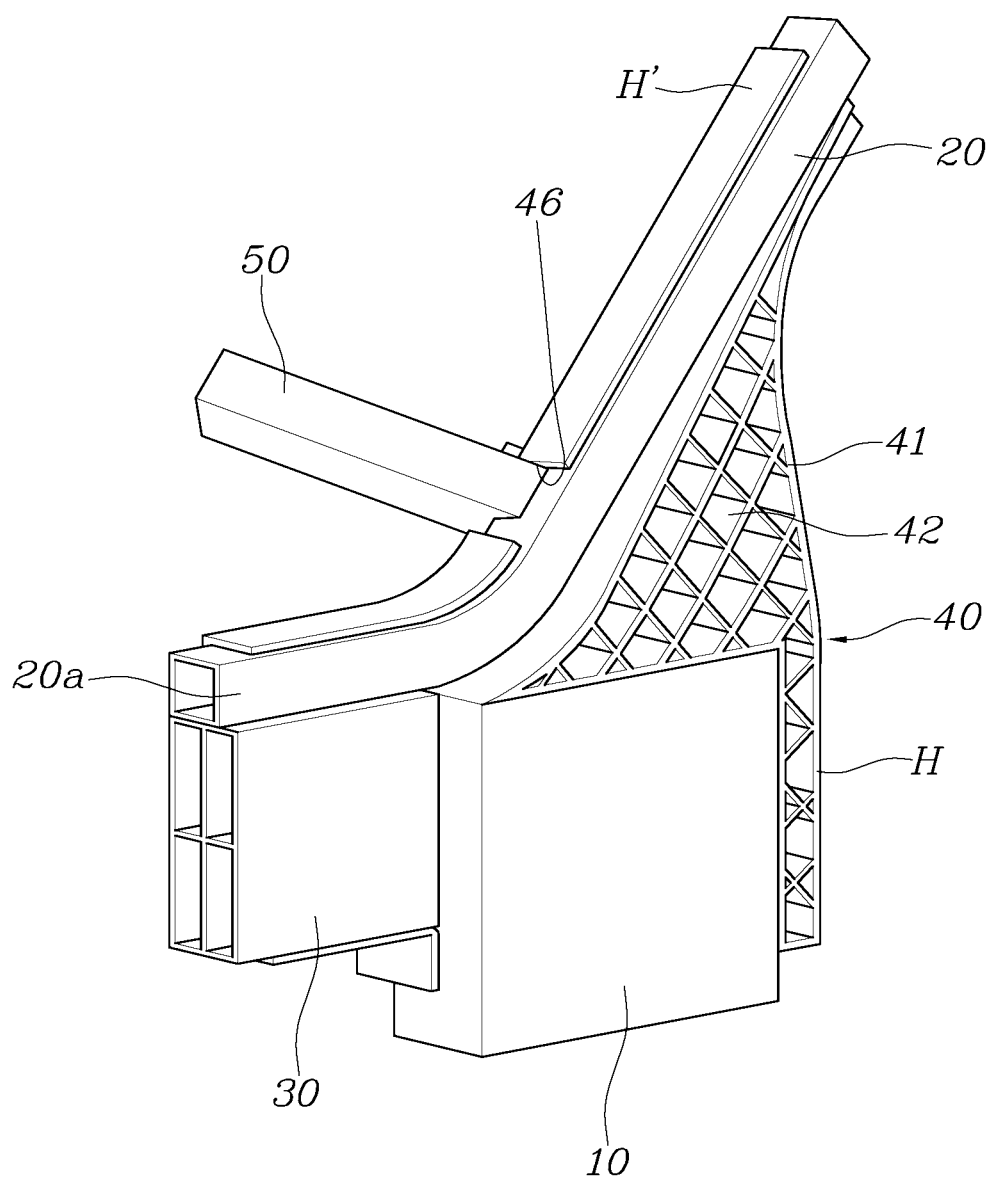
FIG. 7 is a view illustrating another form of the vehicle body joint structure shown in FIG. 2.
Figure 8:
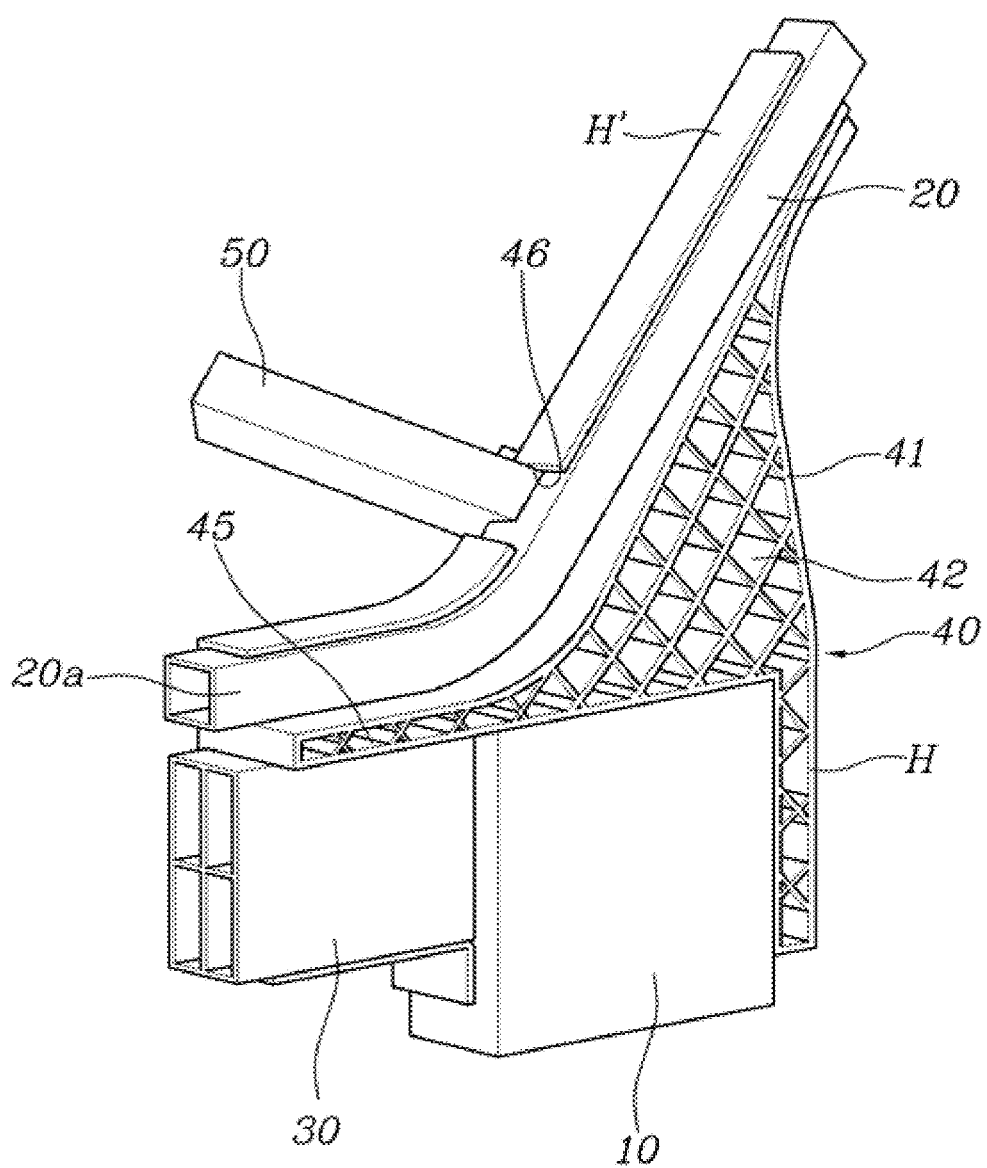
FIG. 8 is a view illustrating another form of the vehicle body joint structure shown in FIG. 2.
Figure 9:
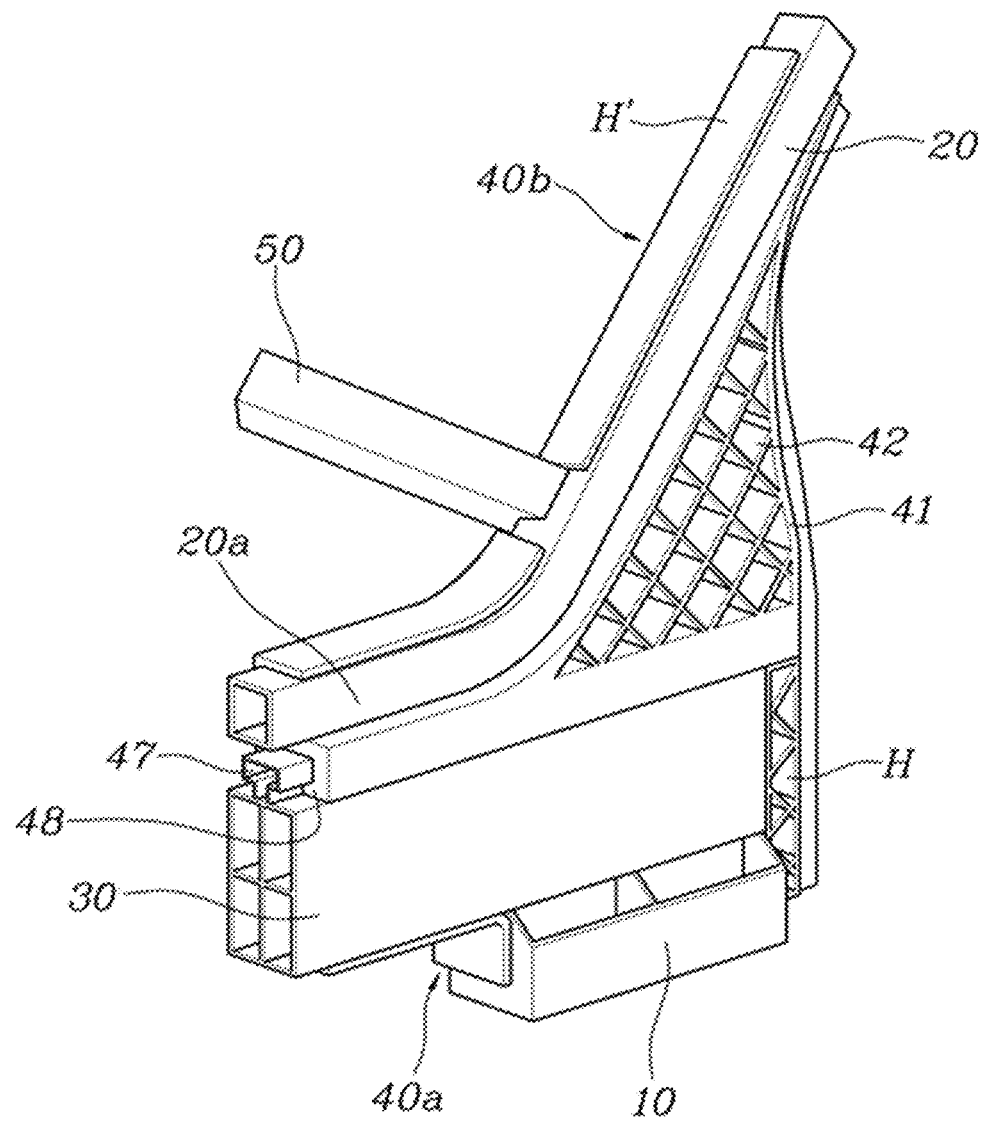
FIGS. 9 to 11 are views respectively illustrating other forms of the vehicle body joint structure shown in FIG. 2.
Figure 10:
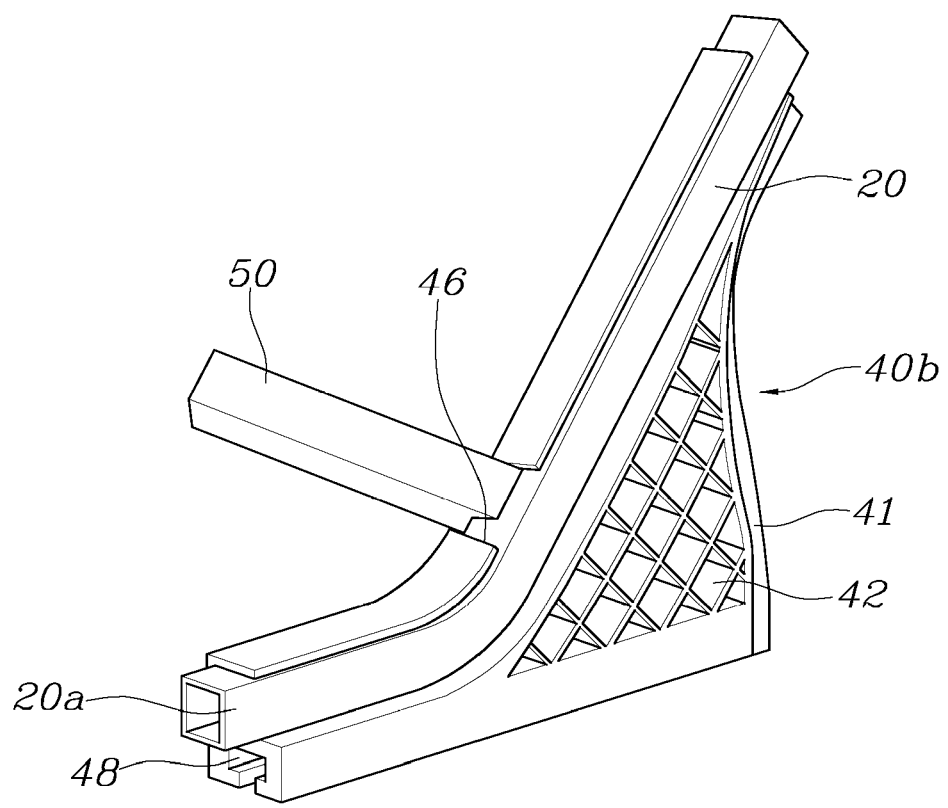
Figure 11:
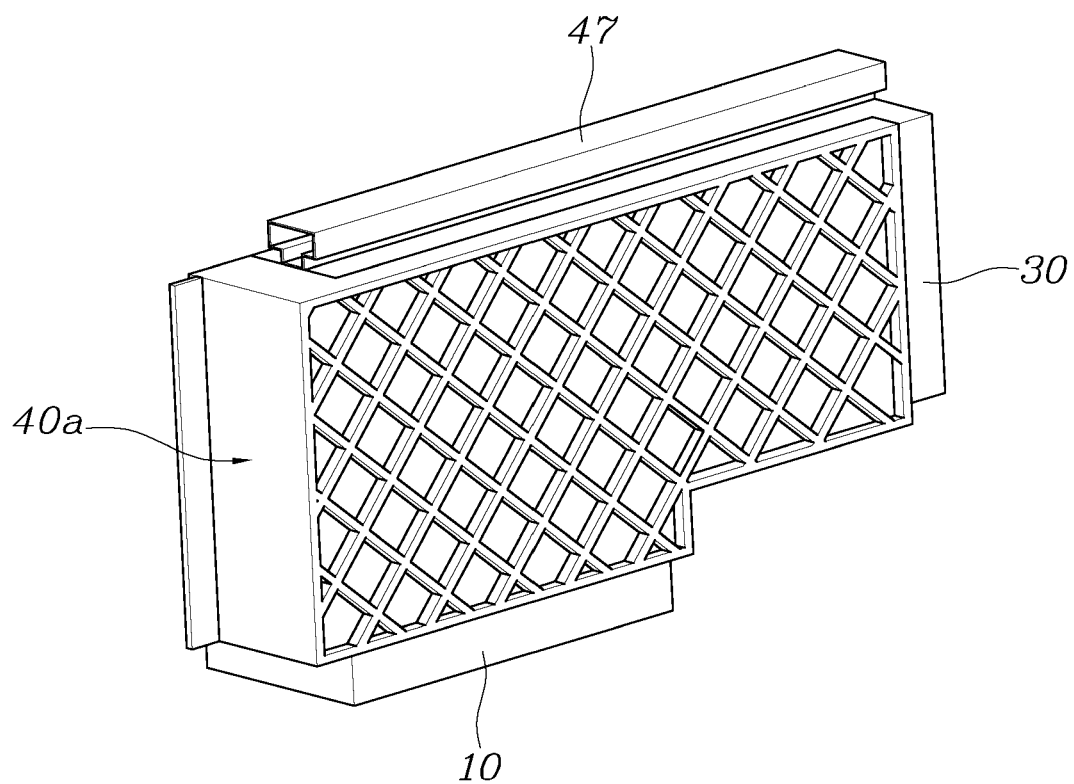

FIG. 1 is a view illustrating an area to which a vehicle body joint structure in one form of the present disclosure is applied. FIGS. 2 to 5 are views respectively illustrating the vehicle body joint structure according to one form of the present disclosure. FIG. 6 is a view illustrating another form of the vehicle body joint structure shown in FIG. 2. FIG. 7 is a view illustrating another form of the vehicle body joint structure shown in FIG. 2. FIG. 8 is a view illustrating another form of the vehicle body joint structure shown in FIG. 2. FIGS. 9 to 11 are views illustrating other forms of the vehicle body joint structure shown in FIG. 2, respectively.

The present disclosure may be applied to a vehicle body having a modular structure in which the vehicle body is divided into a plurality of elements. In such a vehicle body, the vehicle joint structure according to one form of the present disclosure may correspond to a portion A in FIG. 1. The portion A may be constituted by a side assembly of the modular vehicle body.

The present disclosure relates to a lower pillar member 10, an upper pillar member 20 and a middle member 30, which constitute the side assembly, and a connecting bracket 40 configured to connect the elements of the side assembly. In this case, the lower pillar member 10, the upper pillar member 20 and the middle member 30 have a hollow closed cross-sectional structures, respectively, and, as such, may form a space frame structure. Accordingly, the lower pillar member 10, the upper pillar member 20 and the middle member 30 may be easily applied to various kinds and models of vehicles through easy modification thereof according to length adjustment thereof.

In accordance with shape modification of the lower pillar member 10, the upper pillar member 20 and the middle member 30, shapes and sizes of other elements connected to the lower pillar member 10, the upper pillar member 20 and the middle member 30 may be adjusted. As a result, it may be possible to develop a vehicle body suitable for various kinds and models of vehicles and, as such, development of new kinds of vehicles may be easily achieved, and the vehicle body may be effectively applied to a system in which various products are manufactured in reduced numbers.

The vehicle body joint structure according to one form of the present disclosure relates to the portion A in FIG. 1. The vehicle body joint structure includes a lower pillar member 10 extending vertically from a side surface of a vehicle body, an upper pillar member 20 disposed above the lower pillar member 10 while extending vertically, a middle member 30 matched with an upper portion of the lower pillar member 10 while extending in forward and rearward directions, and a connecting bracket 40 to which the lower pillar member 10, the upper pillar member 20 and the middle member 30 are fixedly mounted.

That is, as shown in FIGS. 2 to 5, the lower pillar member 10, the upper pillar member 20 and the middle member 30 are coupled by means of the connecting bracket 40. In detail, the lower pillar member 10 extending vertically from the side surface of the vehicle body, the upper pillar member 20 constituting an A-type pillar or C-type pillar while extending vertically, and the middle member 30 disposed at an upper portion of the lower pillar member 10 while extending in forward and rearward directions form a structure connected by a connector. Accordingly, the lower pillar member 10, the upper pillar member 20 and the middle member 30 may embody a modular vehicle body through the connecting bracket 40 even when they are modified in accordance with a given vehicle kind and model.

For best understanding of the present disclosure, the present disclosure will be described in conjunction with the case in which the present disclosure is provided at the side of an A-type pillar. In connection with this, the upper pillar member 20 may extend from the lower pillar member 10 to be inclined in a forward or rearward direction. This may be determined in accordance with the design of the vehicle body.

In one form of the present disclosure, the upper pillar member 20 extending vertically is disposed above the lower pillar member 10. In addition, the middle member 30 may be disposed at a front side of the lower pillar member 10. Furthermore, the upper pillar member 20 may be coupled to an area where the lower pillar member 10 and the middle member 30 are connected. In this case, the connecting bracket 40 may be formed to have a "L"-shaped lower seat portion H, on which the lower pillar member 10 and the middle member 30 are seated, and an upper seat portion H' extending upwards inclinedly from the lower seat portion H to enable the upper pillar member 20 to be seated thereon.

In accordance with the above-described configuration, the lower pillar member 10, the upper pillar member 20 and the middle member 30 may be mounded to the connecting bracket 40. In this case, the lower pillar member 10, the upper pillar member 20 and the middle member 30 are connected by the connecting bracket 40 and, as such, coupling rigidity and strength may be secured.

Figure 4:
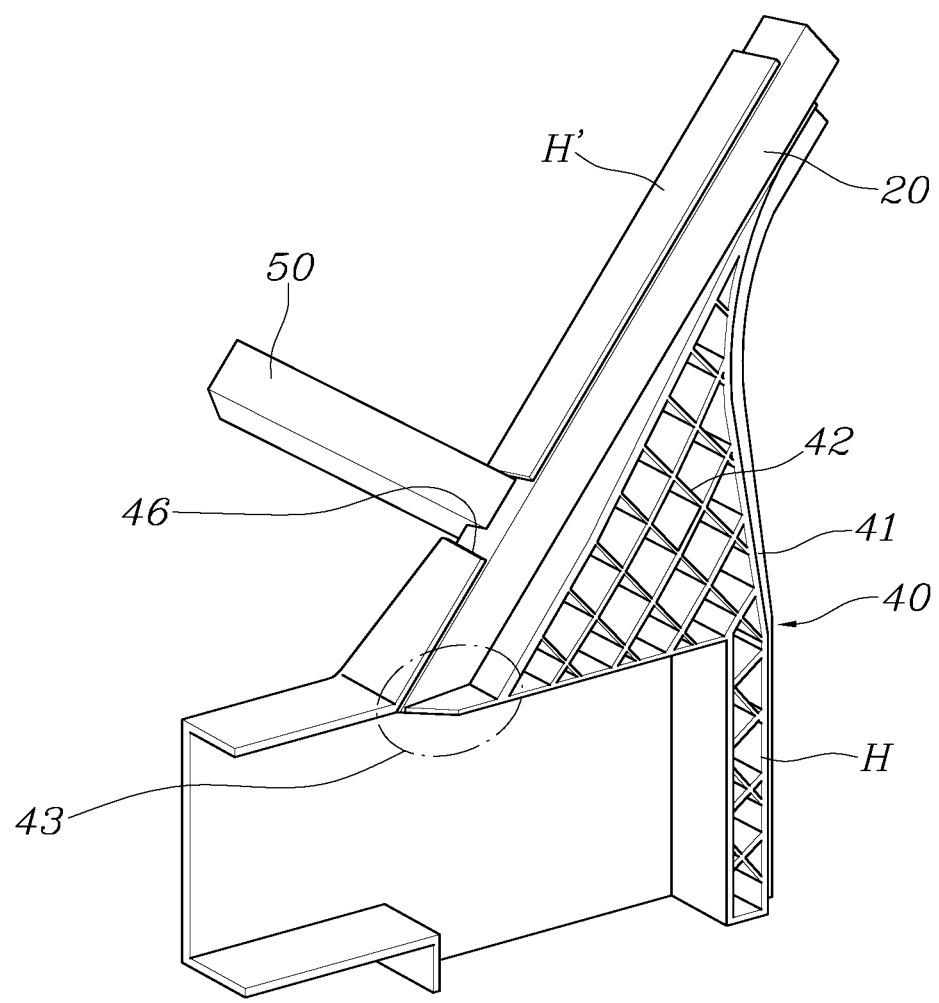
Figure 5:
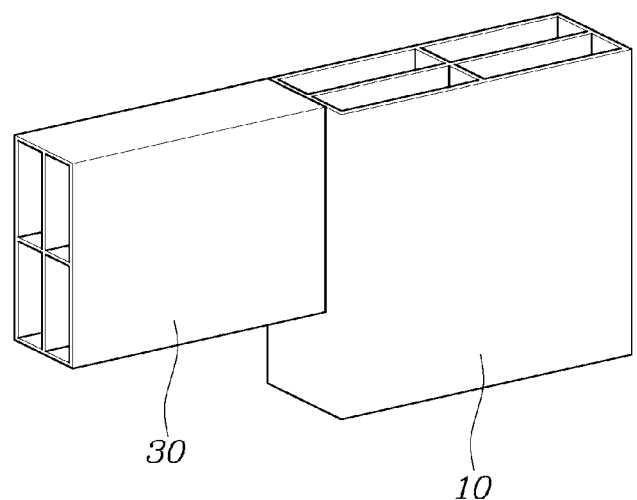

Meanwhile, as shown in FIG. 4, the connecting bracket 40 surrounds the lower pillar member 10, the upper pillar member 20 and the middle member 30. The connecting bracket 40 may be formed with a panel portion 41 configured to fill a space formed between the upper pillar member 20 and the lower pillar member as the upper pillar member 20 extends inclinedly from the lower pillar member 10.

That is, as the upper pillar member 20 extends inclinedly from an upper end of the lower pillar member 10 in a forward or rearward direction, a space is formed between the upper pillar member 20 and the lower pillar member 10. Meanwhile, the upper pillar member 20 should secure support rigidity because the upper pillar member 20 should support a roof assembly. To this end, a panel portion 41 is formed at the connecting bracket 40 to fill the space between the upper pillar member 20 and the lower pillar member 10. Accordingly, it may be possible to secure support rigidity of the upper pillar member 20 mounted to the connecting bracket 40.

Meanwhile, the connecting bracket 40 is formed to have an outer surface directed to an outside of the vehicle body while surrounding the lower pillar member 10, the upper pillar member 20 and the middle member 30, and a closed inner surface directed to an inside of the vehicle body.

Figure 2:
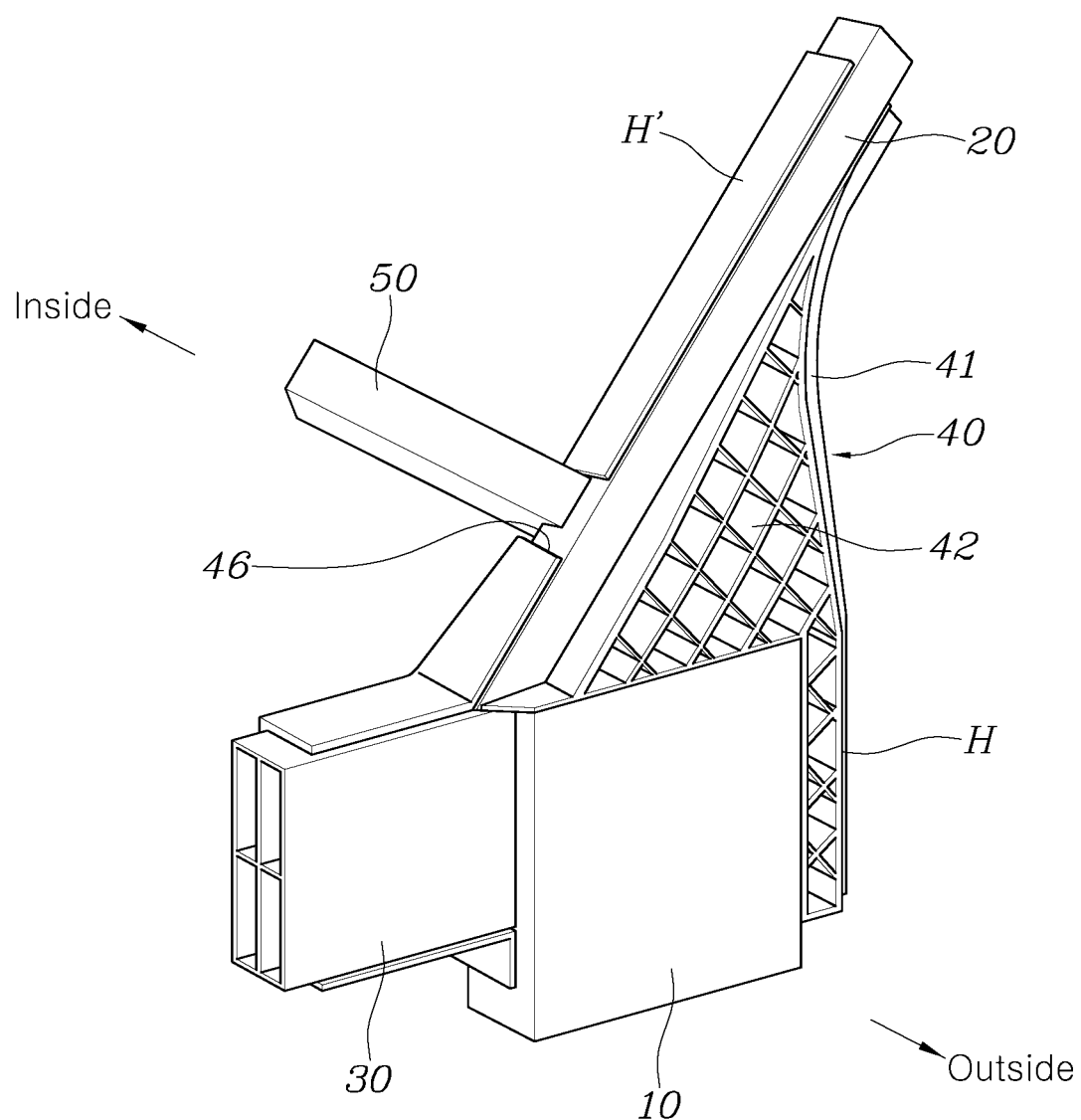
FIGS. 2 to 5 are views respectively illustrating the vehicle body joint structure according to one form of the present disclosure.
Figure 3:
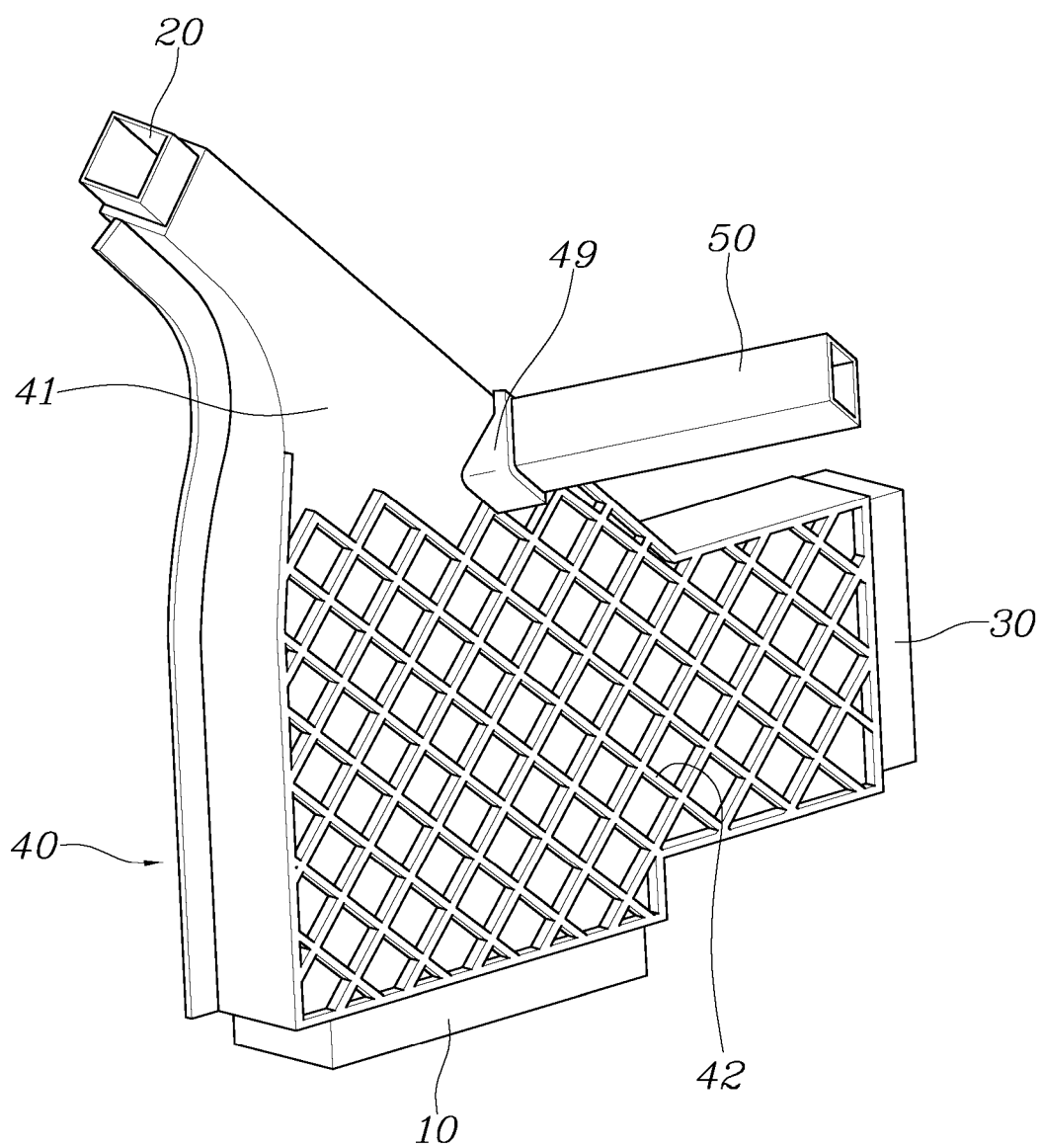

As shown in FIGS. 2 and 3, the outer surface of the connecting bracket 40 is formed to surround the lower pillar member 10, the upper pillar member 20 and the middle member 30 and, as such, the lower pillar member 10, the upper pillar member 20 and the middle member 30 may be mounted to the outer surface of the connecting bracket 40. Accordingly, it may be possible to easily individually mount the lower pillar member 10, the upper pillar member 20 and the middle member 30 to the connecting bracket 40. In particular, areas where respective members are mounted to the connecting bracket 40 are exposed to the outside of the vehicle body and, as such, an assembly task and a replacement task for damaged members may be easily carried out.

Furthermore, the inner surface of the connecting bracket 40 forms a closed surface and, as such, the entirety of the connecting bracket 40 may secure rigidity. In addition, when the lower pillar member 10, the upper pillar member 20 and the middle member 30 are coupled to the connecting bracket 40, coupling rigidity may be secured.

Meanwhile, a plurality of ribs 42 may be formed at the outer and inner surfaces of the connecting bracket 40 such that the ribs 42 extend in different directions to cross each other in cross-sections thereof. The ribs 42 may be formed to be excluded from portions of the connecting bracket 40 to which the lower pillar member 10, the upper pillar member 20 and the middle member 30 are mounted.

In this case, the plural ribs 42 may be modified in thickness and shape in accordance with desired rigidity of the connecting bracket 40. A plurality of polygonal or circular structures may be formed at the outer and inner surfaces of the connecting bracket 40 by the plural ribs 42 and, as such, the entirety of the connecting bracket 40 may secure strength and rigidity. In addition, a plurality of ribs 42 may also be formed at the above-described panel portion 41.

In addition, since the plural ribs 42 are formed to be excluded from portions of the connecting bracket 40 to which the lower pillar member 10, the upper pillar member 20 and the middle member 30 are mounted, there is no degradation in coupling rigidity occurring when the lower pillar member 10, the upper pillar member 20 and the middle member 30 are mounted to the connecting bracket 40. Thus, the entirety of the connecting bracket 40 may have rigidity enhanced by the plural ribs 42.

The connecting bracket 40 may have various connecting structures for the lower pillar member 10, the upper pillar member 20 and the middle member 30 in accordance with various forms.

In one form, as illustrated in FIG. 4, the connecting bracket 40 may have an overlap portion 43 where the lower pillar member 10, the upper pillar member 20 and the middle member 30 are matched. In this case, the lower pillar member 10, the upper pillar member 20 and the middle member 30 may be coupled together through the overlap portion 43.

As the lower pillar member 10, the upper pillar member 20 and the middle member 30 are coupled together at the overlap portion 43 of the connecting bracket 40, easy coupling may be achieved, and coupling strength and rigidity may be secured. That is, the overlap portion 43 of the connecting bracket 40 is an area where all of the lower pillar member 10, the upper pillar member 20 and the middle member 30 are connected and, as such, a structure, in which ends of the lower pillar member 10, the upper pillar member 20 and the middle member 30 are matched through the overlap portion 43 while supporting one another, is formed and, as such, a firm vehicle body joint structure may be formed.

In another form, as illustrated in FIG. 6, the connecting bracket 40 may have the overlap portion 43 where the lower pillar member 10, the upper pillar member 20 and the middle member 30 are matched, and a support portion 44 formed at the overlap portion 43 to partition the lower pillar member 10, the upper pillar member 20 and the middle member 30. The upper pillar member 20 may be seated on the support portion 44.

That is, the support portion 44 may be formed at the overlap portion 43 of the connecting bracket 40 where the lower pillar member 10, the upper pillar member 20 and the middle member 30 are matched and, as such, the lower pillar member 10, the upper pillar member 20 and the middle member 30 may be separated from one another.

Although all of the lower pillar member 10, the upper pillar member 20 and the middle member 30 are not connected to one point of the connecting bracket 40, it may be possible to secure rigidity of the joint through adjustment of material and thickness. In addition, as the lower pillar member 10 and the middle member 30 are configured to be integrated with each other, and the upper pillar member 20 is configured to be separated from the lower pillar member 10 and the middle member 30, shape modification of each member according to different vehicle kinds and models may be easily achieved. In addition, in accordance with the modified shape of each member, a suitable connecting structure may be formed through modification of the connecting bracket 40.

Thus, both the lower pillar member 10 and the middle member 30 are mounted to the connecting bracket 40, and the upper pillar member 20 is seated on the support portion 44 of the connecting bracket 40, and, as such, assemblability and coupling strength of each member may be secured.

Meanwhile, the upper pillar member 20 may have a lower portion 20a extending along the middle member 30 in a forward or rearward direction such that the lower portion 20a is matched with an upper end of the middle member 30.

This is one form of the upper pillar member 20. In this form, as illustrated in FIG. 7, the lower portion 20a of the upper pillar member 20 is formed to extend along the middle member 30. The lower portion 20a of the upper pillar member 20 is coupled to the upper end of the middle member 30 in a matched state. Accordingly, coupling strength of the upper pillar member 20 and the middle member 30 may be secured. In this case, the connecting bracket 40 may be formed to be matched with the shape of the upper pillar member 20. In addition, since the lower portion 20a of the upper pillar member 20 has an extension structure, the entire structure may have enhanced coupling rigidity.

In another form of the upper pillar member 20 associated with the shape thereof, as illustrated in FIG. 8, the lower portion 20a of the upper pillar member 20 may extend along the middle member 30 in forward and rearward directions. In this case, the connecting bracket 40 may be formed with a branching portion 45 configured to partition the upper pillar member 20 and the middle member 30 while extending in forward and rearward directions between the lower portion 20a of the upper pillar member 20 and the middle member 30.

Since the branching portion 45 is formed at the connecting bracket 40 to partition the upper pillar member 20, the lower pillar member 10 and the middle member 30, as described above, the upper pillar member 20, the lower pillar member 10 and the middle member 30 are disposed to be spaced apart from one another without being coupled. Accordingly, the lower portion 20a of the upper pillar member 20 contacts an upper surface of the branching portion 45, and upper ends of the lower pillar member 10 and the middle member 30 contact a lower surface of the branching portion 45, and, as such, the upper pillar member 20, the lower pillar member 10 and the middle member 30 may be coupled by means of the connecting bracket 40. Since the upper pillar member 20, the lower pillar member 10 and the middle member 30 are coupled through the connecting bracket 40, as described above, strength and rigidity may be secured.

Meanwhile, a cowl member 50 may be connected to the upper pillar member 20 such that the cowl member 50 extends toward the inside of the vehicle body. A cutout 46 may be formed at the connecting bracket 40 to allow the cowl member 50 to pass through the connecting bracket 40. In this case, the cowl member 50 may extend across the vehicle body in a transverse direction to connect opposite sides of the vehicle body. In this case, the cowl member 50 may be coupled to the upper pillar member 20.

In this case, as illustrated in FIGS. 2 and 3, the cutout 46 may be formed at the connecting bracket 40 to allow the cowl member 50 to pass through the connecting bracket 40. Accordingly, the cowl member 50 may pass through the connecting bracket 40 through the cutout 46, and may then be coupled to the upper pillar member 20. In this case, the formation position of the cutout 46 may be varied in accordance with the position where the cowl member 50 is connected to the upper pillar member 20. The cutout 46 is formed to have the same shape as the outline of the cowl member 50 and, as such, the cowl member 50 may be matched with the cutout 46. In addition, an extension 49 may be formed at the connecting bracket 40 to support the cowl member 50.

Meanwhile, in one form of the present disclosure, the connecting bracket 40 may include a first part 40a to which the lower pillar member 10 and the middle member 30 are mounted, and a second part 40b to which the upper pillar member 20 is mounted. The second part 40b may be assembled to the first part 40a above the first part 40a.

As illustrated in FIGS. 9 to 11, the connecting bracket 40 is configured to be divided into the first part 40a and the second part 40b and, as such, the parts 40a and 40b may be modified in accordance with a design of the vehicle body. Accordingly, freedom of design of the vehicle body may be enhanced.

In this case, the first part 40a is formed to have a "L"-shaped lower seat portion H such that the lower pillar member 10 and the middle member 30 may be seated on the first part 40a while being surrounded by the first part 40a. The second part 40b may be formed to have an upper seat portion H' extending upwards inclinedly such that the upper pillar member 20 may be seated on the second part 40b. The first part 40a and the second part 40b may be modified in accordance with designs of the individual members and, as such, the design of the vehicle body may be diversified in accordance with different vehicle kinds and models.

In this case, the first part 40a may have a shape extending in forward and rearward directions in accordance with mounting of the middle member 30 thereto. The second part 40b may also have a shape extending in forward and rearward directions at a portion thereof assembled to the first part 40a in accordance with the shape of the first part 40a. Accordingly, the lower portion 20a of the upper pillar member 20 is formed to extend in an extension direction of the middle member 30 and, as such, coupling rigidity of the upper pillar member 20 and the first part 40a may be secured.

Meanwhile, an assembly protrusion 47 may be formed at the first part 40a or the middle member 30 such that the assembly protrusion 47 extends upwards. In addition, an assembly groove 48 may be formed at the second part 40b such that the assembly groove 48 extends downwards. The assembly groove 48 may be matched with the assembly protrusion 47. As the assembly protrusion 47 formed at the first part 40a or the middle member 30 and the assembly groove 48 formed at the second part 40b are matched, assembly convenience and assembly strength may be secured. In this case, the assembly protrusion 47 may be formed at the first part 40a to which the lower pillar member 10 and the middle member 30 are moved, or may be formed at the middle member 30 which is mounted to the first part 40a. When the assembly protrusion 47 is formed at the middle member 30, the middle member 30 and the lower pillar member 10 may be formed to be integrated with each other.

In detail, the assembly protrusion 47 may be formed to extend in forward and rearward directions such that a free end thereof protrudes in inward and outward directions of the vehicle body. In addition, the assembly groove 48 may extend in forward and rearward directions while being opened such that the assembly groove 48 is matched with the assembly protrusion 47. Accordingly, the first part 40a and the second part 40b may be simply assembled through a sliding operation in forward and rearward directions under the condition that the assembly protrusion 47 and the assembly groove 48 are matched with each other. In addition, as the assembly protrusion 47 is formed to protrude upwards from the first part 40*a* or the middle member 30 such that the free end thereof protrudes in inward and outward directions of the vehicle body, the assembly protrusion 47 may have a T shape. In addition, the assembly groove 48 to be matched with the assembly protrusion 47 is formed to be recessed in the form of a T shape. Accordingly, it may be possible to assemble the first part 40*a* and the second part 40*b* through a sliding operation in forward and rearward directions. In an assembled state of the first part 40*a* and the second part 40*b*, robustness in inward and outward directions of the vehicle body may be secured.

In the vehicle body joint structure configured as described above, the elements configured to connect pillars of the vehicle body can be easily shared by various kinds and designs of vehicles and, as such, it may be possible to secure assemblability of elements including the pillars while achieving enhancement in strength and rigidity.

Although the exemplary forms of the present disclosure have been disclosed for illustrative purposes, those skilled in the art will appreciate that various modifications, additions and substitutions are possible, without departing from the scope and spirit of the present disclosure.

What is claimed is:

1. A vehicle body joint structure comprising:
    a lower pillar member extending vertically from a side surface of a vehicle body;
    an upper pillar member disposed above the lower pillar member while extending vertically;
    a middle member matched with an upper portion of the lower pillar member while extending in forward and rearward directions; and
    a connecting bracket to which the lower pillar member, the upper pillar member and the middle member are fixedly mounted,
    wherein the connecting bracket is configured to surround the lower pillar member, the upper pillar member and the middle member, and is formed with a panel portion configured to fill a space formed between the upper pillar member and the lower pillar member as the upper pillar member extends inclinedly from the lower pillar member.

2. The vehicle body joint structure according to claim 1, wherein the upper pillar member is configured to extend from the lower pillar member to be inclined with reference to the lower pillar member.

3. The vehicle body joint structure according to claim 1, wherein the connecting bracket includes:
    an outer surface directed to an outside of the vehicle body while surrounding the lower pillar member, the upper pillar member and the middle member, and
    a closed inner surface directed to an inside of the vehicle body.

4. The vehicle body joint structure according to claim 3, wherein:
    a plurality of ribs is respectively formed on the outer surface and the closed inner surface of the connecting bracket except portions where the lower pillar member, the upper pillar member and the middle member are mounted, and
    ribs of the plurality of ribs are configured to extend in different directions to cross each other.

5. The vehicle body joint structure according to claim 1, wherein:
    the connecting bracket has an overlap portion where the lower pillar member, the upper pillar member and the middle member are matched, and
    the lower pillar member, the upper pillar member and the middle member are coupled together through the overlap portion.

6. The vehicle body joint structure according to claim 1, wherein the connecting bracket includes:
    an overlap portion where the lower pillar member, the upper pillar member and the middle member are matched, and
    a support portion formed at the overlap portion and configured to partition the lower pillar member, the upper pillar member and the middle member, and
    wherein the upper pillar member is seated on the support portion.

7. The vehicle body joint structure according to claim 1, wherein the upper pillar member has a lower portion extending along the middle member such that the lower portion is matched with an upper end of the middle member.

8. The vehicle body joint structure according to claim 1, wherein:
    the upper pillar member has a lower portion extending along an upper end of the middle member; and
    the connecting bracket is formed with a branching portion configured to partition the upper pillar member and the middle member while extending in the forward and rearward directions between the lower portion of the upper pillar member and the middle member.

9. The vehicle body joint structure according to claim 1, wherein:
    a cowl member is connected to the upper pillar member such that the cowl member extends toward an inside of the vehicle body; and
    a cutout is formed at the connecting bracket and configured to allow the cowl member to pass through the connecting bracket.

10. The vehicle body joint structure according to claim 1, wherein the connecting bracket comprises:
    a first part to which the lower pillar member and the middle member are mounted; and
    a second part to which the upper pillar member is mounted, and
    wherein the second part is assembled to the first part above the first part.

11. The vehicle body joint structure according to claim 10, wherein:
    an assembly protrusion is formed at the first part or the middle member such that the assembly protrusion extends upwards, and
    an assembly groove is formed at the second part such that the assembly groove extends downwards to be matched with the assembly protrusion.

12. The vehicle body joint structure according to claim 11, wherein:
    the assembly protrusion is formed to extend in the forward and rearward directions such that a free end thereof protrudes in inward and outward directions of the vehicle body, and
    the assembly groove extends in the forward and rearward directions while being opened such that the assembly groove is matched with the assembly protrusion.

* * * * *